A. B. HERRICK.
METHOD OF WELDING RAIL BONDS.
APPLICATION FILED MAR. 30, 1917.
1,287,689.
Patented Dec. 17, 1918.
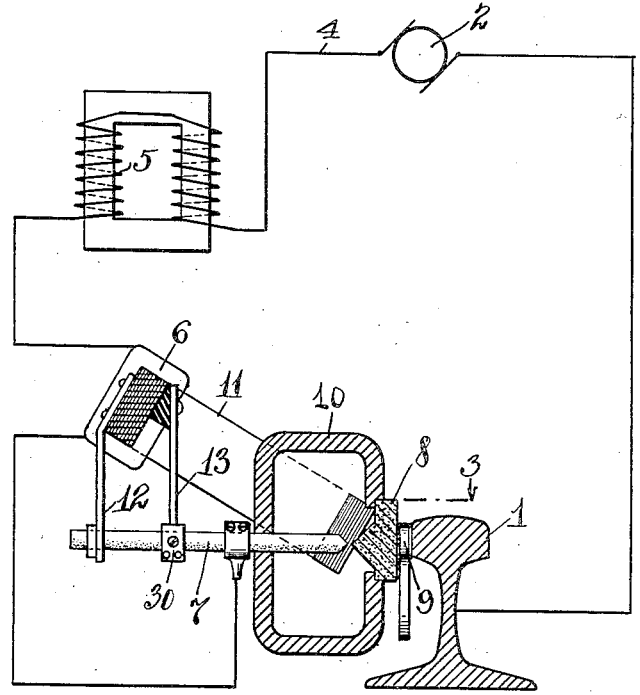
Fig. 1
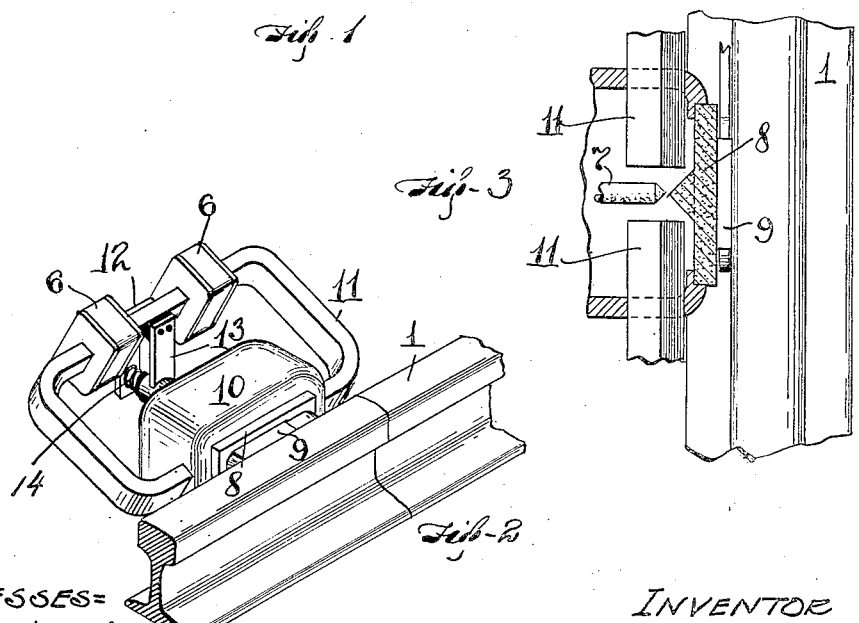
Fig. 3
Fig. 2
WITNESSES:
OM Kappler
Thos. H. Fay
INVENTOR
ALBERT B. HERRICK.
BY
Fay, Oberlin & Fay
ATTORNEYS

UNITED STATES PATENT OFFICE.

ALBERT B. HERRICK, OF CLEVELAND, OHIO, ASSIGNOR TO THE ELECTRIC RAILWAY IMPROVEMENT COMPANY, OF CLEVELAND, OHIO, A CORPORATION OF OHIO.

METHOD OF WELDING RAIL-BONDS.

1,287,689.

Specification of Letters Patent.

Patented Dec. 17, 1918.

Application filed March 30, 1917. Serial No. 158,626.

*To all whom it may concern:*

Be it known that I, ALBERT B. HERRICK, a citizen of the United States, and a resident of Cleveland, county of Cuyahoga, and State of Ohio, have invented a new and useful Improvement in Methods of Welding Rail-Bonds, of which the following is a specification, the principle of the invention being herein explained and the best mode in which I have contemplated applying that principle, so as to distinguish it from other inventions.

The subject of the present invention is a method of, and apparatus for increasing the resistance of an electric arc, together with one application of such method directed to the welding of the bond to a rail joint. One principal object of the invention is to provide a method of alternately increasing and decreasing the resistance across an arc in order to effect an intermittent operation of the arc, the arc being made and broken automatically without the use of any moving mechanism. The advantages and uses of such a method are numerous and will readily suggest themselves to those skilled in the various branches of electricity and the only adaptation which I have here described being to the art of welding, and more specifically to the welding of a bond to a rail joint. To the accomplishment of the foregoing and related ends, said invention, then, consists in the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a vertical section through a rail and bond applied thereto, and a portion of my apparatus, other portions of the same being shown in elevation, and also diagrammatically; Fig. 2 is a perspective view from above of my apparatus as constructed for welding a bond to a rail; and Fig. 3 is a section on the line 3—3 in Fig. 1.

For the sake of clearness and convenience I have shown, and will now describe, my invention as applied to the bonding of a rail, but it will be appreciated that the invention is not thereby limited in any way to this specific use, since obviously, it may with equal success be applied to many other functions and machines wherever an intermittent action is desired without the use of moving elements.

Many attempts have been made to weld a bond to a rail by taking current directly from the trolley wire or third rail, and passing this current through the bond and the portion of the rail to which it is to be applied. These attempts have always failed except where some means was found in interrupting the current flow to prevent overheating and melting of the bond, and various apparatus have been devised for thus interrupting the continuity of the current. By the use of my present invention it becomes possible to automatically interrupt the current flow and thus produce an intermittent and effective action of this current on the heating of the bond and the rail, producing in this way an effective union between the two without any burning or melting of the bond, and without heating the bond before the contacting portion of the rail has been raised to the desired temperature.

In Fig. 1, I have shown a rail 1 which is connected to the negative pole of a generator 2 which is connected to the trolley wire or third rail, the circuit being indicated by the line 4. In the circuit there is disposed a re-actance coil 5 which acts to reduce the voltage and the current is sent from this coil to the coil 6 of an electro-magnet, the armature 11 of which is curved in the manner indicated in Fig. 2 with the two poles facing each other and spaced but a short distance apart. The current from the coil of the electro-magnet is carried to an electrode 7, between which and a contact member 8 of suitable refractory material, the arc is produced. This contact member is placed against the terminal of the bond 9, and when the arc is produced between the electrode and the contact member, the latter will of course be raised to such a temperature that it will heat the terminal of the bond and also the rail and produce a welding temperature therein. The electro-magnet is so placed that, when energized, it will establish an electro-magnetic field between the two electrodes (when spaced for arcing) so that a considerable resistance to passage of the arc is set up. The electro-magnet is also designed to exert a strong attraction on the arc and the result will be an increase in the resistance across the arc due to the lines of force of the magnetic field and also to the greater length of arc caused by the arcing of the arc by the attraction of the electro-magnet.

The effect of this increase in resistance will be proportional to its intensity, and if sufficient then the arc will be ruptured or blown out. As soon as broken the magnetism of the electro-magnet will be lost and the arc can then readily reëstablish itself between the electrodes when the action will be repeated. The periodicity of the action will depend upon the circuit conditions and upon the strength and position of the electro-magnet which can be varied as desired.

The contact member 8 and the forward end of the electrode 7 are inclosed within a casing 10 provided with lateral apertures through which pass the poles of the armature 11. These poles are disposed on either side of the end of the electrode 7 and the contact member 8, the latter being provided with a small conical projection extending toward the electrode. By thus inclosing the arc and the electrodes the reëstablishment of the arc after rupture is greatly facilitated as will be readily appreciated. The electrode is slidably carried in a supporting strap or socket 12 attached to the electromagnet, while also attached to the electromagnet is a second socket 13 which will adjustably carry the electrode 7, the adjustment being made by means of a screw 30 to take up for wear on the electrode.

The operation of the device is as follows. The circuit is closed, thus passing the current through the electrode to the contact member, and producing an arc between these two points, as soon as the resistance of the air gap is broken down. These members are so spaced that the resistance necessary to bridge this air gap requires a drop of about 50 volts. At the same time the electro-magnet is energized and the poles of this magnet will operate upon the arc produced between the members 7 and 8 to deflect it from a straight path between these two elements and cause it to form a semicircle between these two lying on the side of the electrode opposite to whichever is the north pole of the magnet. At the same time the energizing of the magnet will draw the bar 13 toward it, thus moving the electrode to the left and increasing the length of the arc, and in this way also raising the voltage necessary to maintain this arc. The lengthening of the arc by reason of the movement of the electrode 7 and the deflection of the arc caused by the pull of the poles 11, will so greatly increase the path of travel of this arc, that the resistance will be very much increased and the voltage drop will be increased from 50 volts to about 250. The magnet is so designed that with an arc of this length and high resistance, it will be able to blow out or snuff out the arc and thus break the circuit. The breaking of the circuit deënergizes the magnet and the arc is readily reëstablished. The magnet will then be again energized and will withdraw the electrode, thus again producing an arc between the electrode 2 and the contact member 8. The magnet operates to withdraw the electrode 7 through its magnetic action on the bar 13 which is attached to the electrode, while a spring 14 serves to return the electrode toward the plate 8 and reëstablish the arc. This operation will be automatically repeated as long as the circuit is closed through the generator.

It will be obvious that my method is not restricted to the present application and may be used for other purposes and in other apparatus wherever it is desired to secure an automatic but intermittent action of a machine operated by an electric current. By means of the present apparatus, however, it is possible to weld bonds on rails very effectively, since the action is wholly automatic and if the machine is properly designed will break and reëstablish the arc at such intervals as to produce an intermittent but even heating of the contact member 8, which in turn raises the temperature of the bond and of that portion of the rail against which it is pressed, to a welding temperature.

The arc between the electrode and the contact member 8, when once broken down, will remain so and will not offer as much resistance as at first to the establishment of the electric arc. Thus there is little delay or difficulty experienced in the reëstablishment of the electric arc after it has been blown out by the electro-magnet.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. In a method of homogeneously welding a bond to a rail, the steps which consist in placing a bond with its terminal in contact with a rail, disposing a plate of high resistance material against the other side of such terminal, and then intermittently making and breaking an electric arc formed with such plate as the negative electrode.

2. In a method of homogeneously welding a bond to a rail, the steps which consist in placing a bond with its terminal in contact with a rail, disposing a plate of high resistance material against the other side of such terminal, establishing an arc with such plate as the negative terminal, increasing the resistance of such arc, rupturing such arc, and then reëstablishing and again increasing the resistance of the same.

3. In a method of homogeneously welding a bond to a rail, the steps which consist in placing a bond with its terminal in contact with a rail, disposing a plate of high resistance material against the other side of such terminal, establishing an arc with such plate as the negative terminal, increasing the resistance of such arc, rupturing such arc, and then reëstablishing such arc and repeating such steps.

4. In apparatus of the character described, the combination of two spaced electrodes, one of said electrodes being in the form of a plate adapted to lie against a bond terminal, means adapted to adjust said electrodes with respect to each other, an electro-magnet disposed about the other of said electrodes, said electro-magnet being positioned to set up a magnetic field across the space between said electrodes and being connected in series with said last-named electrode, and a member inclosing the adjacent terminals of said electrodes and the ends of said electro-magnet.

Signed by me, this 31st day of January, 1917.

ALBERT B. HERRICK.